United States Patent
Rezayat

(10) Patent No.: US 10,307,961 B2
(45) Date of Patent: Jun. 4, 2019

(54) INTELLIGENT 3D PRINTER AND METHOD

(71) Applicant: Siemens Product Lifecycle Management Software Inc., Plano, TX (US)

(72) Inventor: Mohsen Rezayat, Cincinnati, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1153 days.

(21) Appl. No.: 14/535,923

(22) Filed: Nov. 7, 2014

(65) Prior Publication Data
US 2015/0142152 A1   May 21, 2015

Related U.S. Application Data

(60) Provisional application No. 61/907,091, filed on Nov. 21, 2013.

(51) Int. Cl.
*B29C 64/386*   (2017.01)
*B28B 1/00*   (2006.01)
(Continued)

(52) U.S. Cl.
CPC ............ *B29C 64/386* (2017.08); *B28B 1/001* (2013.01); *B29C 64/20* (2017.08); *B29C 64/307* (2017.08);
(Continued)

(58) Field of Classification Search
CPC ......... B33Y 10/00; B33Y 30/00; B33Y 40/00; B33Y 50/00; B33Y 50/02; B33Y 80/00; B29C 64/20; B29C 67/0059; B29C 67/0074; B29C 67/0077; B29C 67/0081; B29C 67/0092; B28B 1/001; G06F 17/30; G06F 17/30259; G06F 17/50; G05B 19/406; G05B 19/4097; G05B 2219/35134; G05B 2219/35135; G05B 2219/35189;
(Continued)

(56) References Cited

U.S. PATENT DOCUMENTS 6,936,212 B1 *   8/2005   Crawford .................. B28B 1/00
                                                                264/308
8,019,788 B1 *   9/2011   Carter ............... G06F 17/30153
                                                                707/602

(Continued)

FOREIGN PATENT DOCUMENTS

JP   2013-114676 A1   6/2013
WO   2013-113372 A1   8/2013

OTHER PUBLICATIONS

Orcutt, M. "Automated Manufacturing for 3-D Printers." MIT Technology Review, Oct. 31, 2013, 2 pages.
(Continued)

*Primary Examiner* — Crystal J Barnes-Bullock

(57) ABSTRACT

A 3D printer system and related methods. The 3D printer system includes a processor and an accessible memory. The accessible memory includes a CAD kernel and a product file that defines a CAD solid model. The 3D printer system is particularly configured to execute the CAD kernel using the processor, process the product file using the CAD kernel to produce the CAD solid model, and produce a solid physical object corresponding to the CAD solid model.

14 Claims, 4 Drawing Sheets

(51) Int. Cl.
*B29C 64/307* (2017.01)
*B29C 64/20* (2017.01)
*B33Y 80/00* (2015.01)
*B33Y 30/00* (2015.01)
*B33Y 10/00* (2015.01)
*B33Y 50/02* (2015.01)

(52) U.S. Cl.
CPC ............... *B33Y 10/00* (2014.12); *B33Y 30/00* (2014.12); *B33Y 80/00* (2014.12); *B33Y 50/02* (2014.12); *G05B 2219/35003* (2013.01); *G05B 2219/49023* (2013.01); *Y02P 90/265* (2015.11)

(58) Field of Classification Search
CPC ........... G05B 2219/37441; G05B 2219/49023; G06T 15/00; G06T 19/00; G06T 2200/04; G06T 2200/08; G06K 9/00201; G06K 9/00208; H04N 13/0203; H04N 13/0275
See application file for complete search history.

(56) References Cited

U.S. PATENT DOCUMENTS

| | | | | |
|---|---|---|---|---|
| 8,515,826 | B2* | 8/2013 | Norman | G06Q 30/06 705/26.1 |
| 9,169,968 | B2* | 10/2015 | Pettis | F16M 11/12 |
| 9,330,206 | B2* | 5/2016 | Dean | G06T 19/00 |
| 9,619,942 | B2* | 4/2017 | Finn | G06T 7/50 |
| 9,821,519 | B2* | 11/2017 | Schouwenburg | G06F 17/50 |
| 2002/0149137 | A1* | 10/2002 | Jang | G03F 7/0037 264/494 |
| 2004/0249809 | A1* | 12/2004 | Ramani | G06F 17/30259 |
| 2009/0130633 | A1* | 5/2009 | Kraemer | G06Q 20/10 433/201.1 |
| 2011/0002531 | A1* | 1/2011 | Heisele | G06K 9/00208 382/154 |
| 2011/0087350 | A1 | 4/2011 | Fogel et al. | |
| 2011/0205583 | A1* | 8/2011 | Young | G06T 17/00 358/1.15 |
| 2011/0313878 | A1* | 12/2011 | Norman | G06Q 30/06 705/26.5 |
| 2012/0133080 | A1* | 5/2012 | Moussa | B33Y 10/00 264/308 |
| 2012/0261848 | A1* | 10/2012 | Haraszati | A61C 13/0004 264/17 |
| 2012/0315333 | A1* | 12/2012 | Zhou | A61K 9/2095 424/484 |
| 2013/0193621 | A1 | 8/2013 | Daya et al. | |
| 2013/0235412 | A1 | 9/2013 | Baldwin et al. | |
| 2014/0067609 | A1* | 3/2014 | Heger | G06Q 30/0623 705/26.61 |
| 2014/0085501 | A1* | 3/2014 | Tran | H04N 5/23238 348/222.1 |
| 2014/0371895 | A1* | 12/2014 | Sadusk | B33Y 10/00 700/98 |
| 2015/0064047 | A1* | 3/2015 | Hyde | B22F 3/1055 419/26 |
| 2015/0094837 | A1* | 4/2015 | Cohen | B29C 67/0074 700/98 |
| 2017/0249729 | A1* | 8/2017 | Greene | G01B 21/047 |

OTHER PUBLICATIONS

"JT File Format Reference, Version 9.5, Rev-A." Siemens, 2010, 452 pages.
Stava, O., et al. "Stress Relief: Improving Structural Strength of 3D Printable Objects." ACM Transactions on Graphics (TOG), Apr. 2012, 11 pages.
Greenmeier, L. "What is 4-D Printing? [Video]." Scientific American, Retrieved from the internet Nov. 7, 2014: URL: http://www.scientificamerican.com/article.cfm?id=what-is-4-d-printing-manufacturing&WT.mc_id=SA_WR_20131107 (6 pages).
PCT Search Report dated Feb. 16, 2015, for application No. PCT/US2014/064904, 10 pages.

* cited by examiner

INTELLIGENT 3D PRINTER AND METHOD

REFERENCE TO RELATED APPLICATION

This application claims the benefit of the filing date of U.S. Provisional Patent Application 61/907,091, filed Nov. 21, 2013, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems), and in particular to additive manufacturing or "3D" printing systems with enhanced CAD capabilities.

BACKGROUND OF THE DISCLOSURE

Additive manufacturing or "3D" printing systems produce solid objects from design files or other specifications. Improved systems are desirable.

SUMMARY OF THE DISCLOSURE

Various disclosed embodiments include flexible and intelligent 3D printers that include an embedded CAD system such as a Parasolid kernel of Siemens Product Lifecycle Management Software Inc. (Plano, Tex.). Disclosed embodiments include 3D printers that can directly interpret and use the JT file format. Disclosed embodiments include flexible and intelligent 3D printers that include embedded CAD software, and printers that can use an efficient and open interface file format that supports boundary representation (b-rep) CAD data, product manufacturing information (PMI), and layer information.

Disclosed embodiments include a 3D printer system and related methods. In some embodiments, the 3D printer system includes a processor and an accessible memory. The accessible memory includes a CAD kernel and a product file that defines a CAD solid model. The 3D printer system is particularly configured to execute the CAD kernel using the processor, process the product file using the CAD kernel to produce the CAD solid model, and produce a solid physical object corresponding to the CAD solid model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
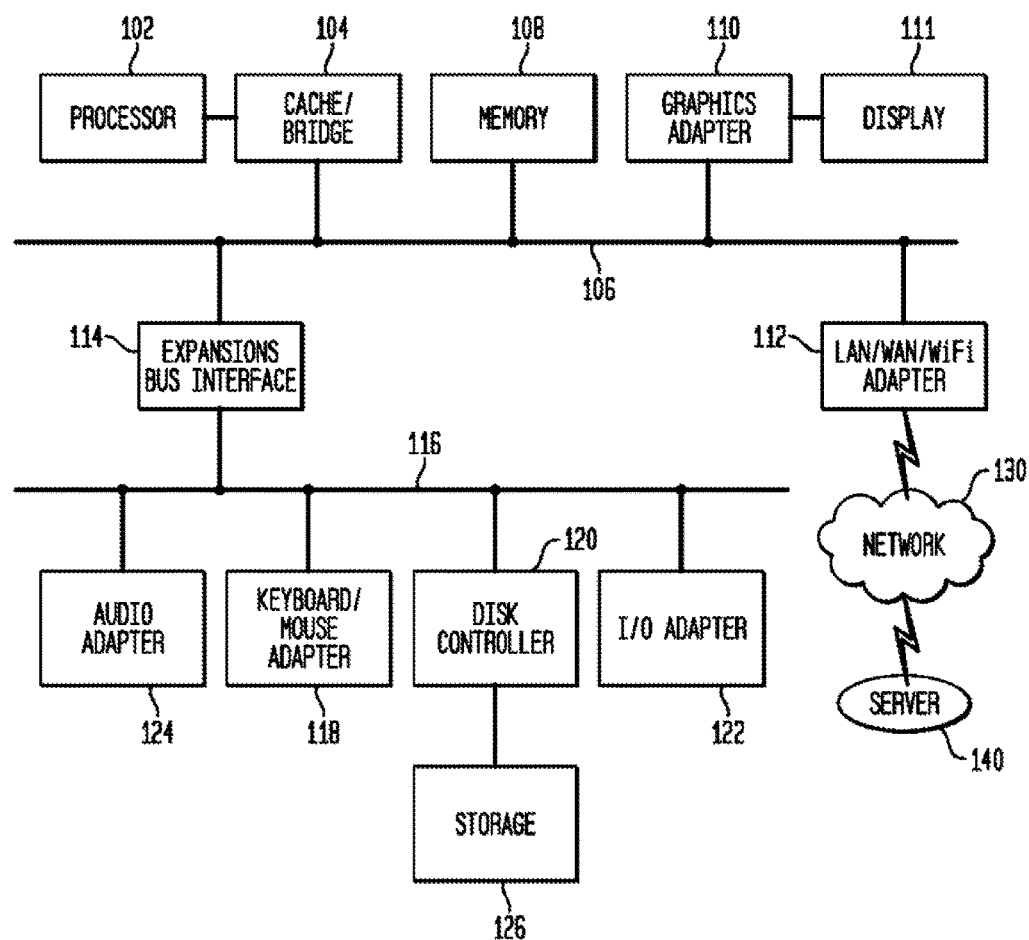
FIG. 1 illustrates a block diagram of a data processing system in which an embodiment can be implemented.

FIGS. 1-4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Additive manufacturing, also called 3D printing, is a process of making a three-dimensional solid object of virtually any shape from a digital model defined primarily in stereolithography (STL) format. Despite this promise, design flaws can greatly impact the quality of 3D-printed items, leaving some objects unable to support their own weight or too fragile to serve their intended purpose. Furthermore, 3D printers are currently very slow and unable to take advantage of properties like PMI to add efficiency and intelligence to the manufacturing process. Finally, the current process using STL or similar formats is disjointed, fragmented, and error prone.

Disclosed embodiments include 3D printers with embedded CAD processing capabilities, such as but not limited to a Parasolid kernel, and 3D printers that can directly interpret CAD interchange formats such as the JT format as described in the JT File Format Reference Version 9.5 Rev-A, found at time of filing at www.plm.automation.siemens.com/de_de/Images/JT_v95_File_Format_Reference_Rev-A_tcm73-111987.pdf and hereby incorporated by reference.

Creating the "right part the first time" with 3D printing currently requires specialized knowledge of geometry, materials, and manufacturing processes. As described herein, much of this knowledge can be embodied within the CAD file itself. This includes geometric dimensioning and tolerancing, 3D annotation (text), surface finish, material specifications that could guide a "smart" printer to print a functionally viable part in the first run, even with new materials, and others.

The advantages for users are numerous due to the decoupling of design from manufacturing and the ability to add "intelligence" to 3D printers with the richness of JT and other CAD-definition files. Because JT is the first ISO standard neutral file format widely accepted in the market, 3D printer manufacturers will also benefit greatly from adopting its precise representation to add accuracy, efficiency, flexibility, and unique functionality. Also, using the methods proposed here will allow the 3D printers to future-proof any design. When better materials come on-line in the future, the consumer will not have to revise his or her design to take advantage of the improved strength or adaptive functionality; instead, the 3D printer can automatically update the design and then print using the new materials. This would also allow multiple quality products to be built from different materials using the same design. Finally, a fully digital 3D Printing workflow requires consistency; a single source of engineering & design info for upstream and downstream processes to provide continuity of all operations. The use of an engineering-rich file format such as JT will allow different geometry representations, such as shape level of detail (LOD), b-rep, or ultra lightweight precise (ULP), and integration of metadata, such as PMI, textures, and material properties, as well as being the single standardized data format for all upstream and downstream applications.

FIG. 1 depicts a block diagram of a data processing system in which an embodiment can be implemented, for example as a PDM system particularly configured by software or otherwise to perform the processes as described herein, including interacting with and operating a 3D printer as disclosed. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
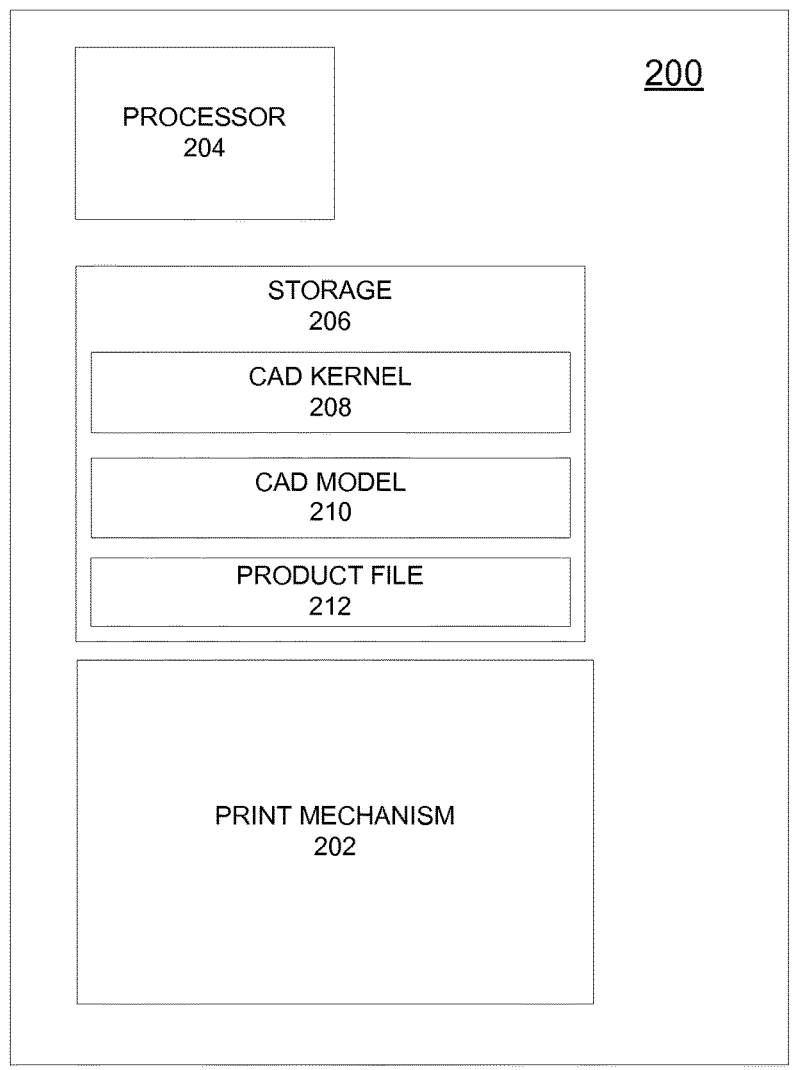
FIG. 2 illustrates a block diagram of a disclosed embodiment of a 3D printer in accordance with disclosed embodiments.

FIG. 2 illustrates a block diagram of a disclosed embodiment of a 3D printer system 200. Print mechanism 202 can be implemented using conventional 3D printer techniques. Storage 206 includes, among other data and programs, a CAD Kernel 208, such as a Parasolid kernel, and a product file 212 that defines a CAD model 210, which can be in the JT file format, or other format. Other features, components, functions, and other details of 3D printer 200 can be implemented using known techniques or using other techniques disclosed herein.

Additive manufacturing is a group of technologies with one common characteristic of adding material to form a part rather than subtracting material as in traditional machining There are widespread technology solutions capable of working with a large number of materials (e.g., plastics, steels, sand, cements, ceramics and organic materials). In fact, materials can be tailored to suit the function of a product or part of product. Material development is emerging as a key area where manufacturers can create new products and differentiate themselves from competitors. Using these new materials, engineers and hobbyists can produce geometrical concepts that were previously impossible to manufacture, leading to unprecedented design freedom and demanding new design and analysis capabilities.

3D printing generally involves generating a 3D geometric representation of one or more objects to be printed (i.e., manufactured by a 3D printer). Such a 3D geometric representation is referred to as 3D model and is currently generated on a separate computer system using CAD software such as NX (available from Siemens Product Lifecycle Management Software Inc., Plano, Tex.), AutoCad (available from Autodesk, San Rafael, Calif.), or SolidWorks (available from Dassault Systemes SolidWorks Corp., Vélizy, France). A 3D model may be stored in a 3D data file using a specific file format suitable for 3D printing. The 3D data file may be processed to generate instructions that are processed by a 3D printing system for reproducing the object. Such a geometry definition data file may be constructed using a variety of file formats including stereolithography (.stl) file format, polygon file format (.ply), or additive manufacturing file (.amf) format, or 3D Manufacturing Format (3MF).

There has been a huge acceleration in development of professional systems for industrial use and widespread evaluation and utilization. Industry is now using additive manufacturing technologies not only for prototyping (where it has been used for many years) but also for production parts. The accuracy of 3D printers for both plastics and metal) varies greatly from +/−0.1 mm to +/−0.01 mm, with a slice thickness as small as 20 microns. This makes finished, fully-working metallic parts achievable in some industries. Despite the surge in popularity, additive manufacturing is still a developing technology and the current usage is still limited. One of the biggest limiting factors is the lack of software to support the technology from a design-to-manufacture perspective. Disclosed embodiments embed an efficient and small CAD system like Parasolid within 3D printers. This CAD system can be implemented using CAD kernel 208 and processor 204.

Certain breakthroughs in how things are made lie not in the technology to manipulate materials but in the materials themselves. Disclosed embodiments allow manufacturers to build intelligence within the device and take advantage of the "richness" contained within the JT file format to deal with any current and future materials. Examples of the breakthrough research include "4D printing" (where programmable materials continue to evolve in response to their environment), "automated manufacturing for 3D printers" (where, drawing on artificial-intelligence capabilities, researchers are developing software meant to help make manufacturing accessible to people without manufacturing expertise), and "automated structural analysis for 3D printers" (where automatic detection and correction of the problematic cases are accomplished through hollowing, thickening, and strut insertion). All of these approaches benefit from a CAD kernel 208 embedded in the 3D printer as disclosed herein, particularly when used with the Parasolid product and a JT interface to CAD.

Parts represented by the Parasolid boundary representation (XT) format contain precise geometric boundary representation (b-rep) data. Therefore, an XT b-rep JT file can be manipulated by the Parasolid kernel embedded within the printer. The JT Open Toolkit (JTTK) is capable of reading and writing XT b-rep data through extended XT b-rep classes and constructing Parasolid topology. Any 3D printer manufacturer can use the JTTK and the embedded Parasolid kernel to enable unique features for that particular printer. Furthermore, the richness of JT format can be further exploited by printer manufacturers (e.g., LOD and metadata segments) to add additional features by taking advantage of the PMI content, layers and layer filters, analytic features, etc.

Figure 3:
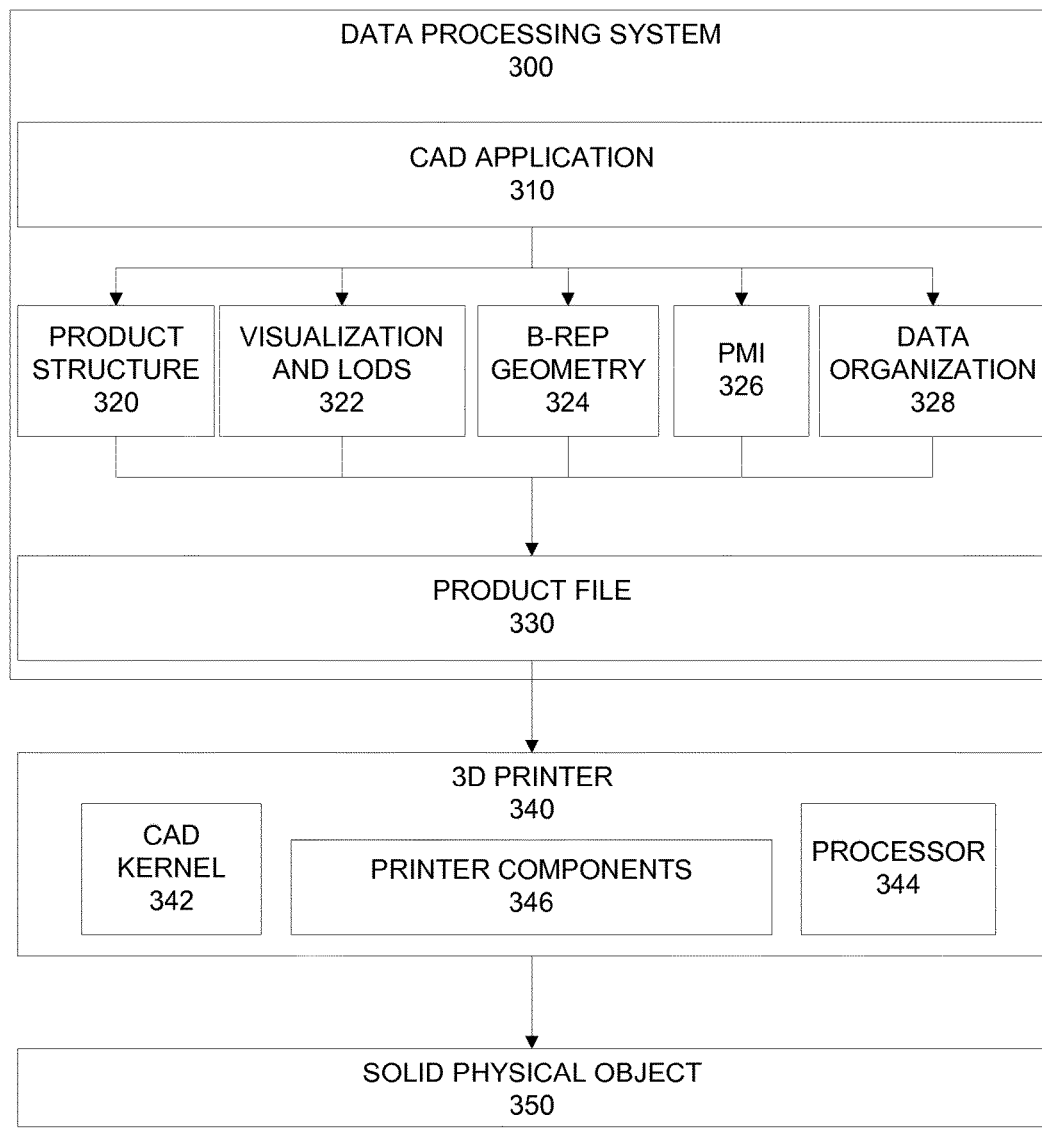
FIG. 3 illustrates an interaction of various components in accordance with disclosed embodiments.

FIG. 3 illustrates an interaction of various components in accordance with disclosed embodiments. In this figure, a data processing system 300, which can be implemented as a data processing system 100, includes a CAD application 310. The CAD application 310 can operate, including interacting with a user, to create a product file 330. Product file 330 can be a CAD file, such as a JT file, that defines a product to be manufactured by including one or more of a product structure 320, including layer information, visualizations and levels of details 322, b-rep geometry 324, PMI 326, and data organization 328.

The product file can be received by a 3D printer 340 that includes a CAD kernel 342 and a processor 344, as well as other conventional 3D printer components 346. 3D printer 340 can be implemented as 3D printer 200 described above. The CAD kernel can be a Parasolid or other CAD kernel. The processor 344 and CAD kernel 342 can directly read and interpret the product file 330, and use product file 330 to produce the product using 3D printing techniques. 3D printer components 346 can include such components as the frame, head movement mechanics, motors, print heads/extruders, and electronics such as a controller, interface circuitry, and others, as well as the firmware to control each of these. 3D printer components 346 can also include a user interface to allow a user to view, modify, or otherwise manipulate a solid model represented by the product file 330 on the 3D printer 340 itself before, during, or after printing to produce a solid physical object 350.

Lower-end 3D printers and even high-end 3D printers for plastic parts are non-limiting examples of 3D printers that would benefit from disclosed embodiments and can be used to implement 3D printer 340.

According to disclosed embodiments, a 3D printer 340 as disclosed herein can print any hardware-supported resolution with the same product file 330 by decoupling the resolution from the file size. This in contrast to systems in which the resolution is dependent on the STL file size, where greater resolution requires a much larger STL file.

According to disclosed embodiments, a 3D printer 340 as disclosed herein can incorporate digital rights management (DRM) at the printer, allowing the product file 330 to be exchanged freely, but validating the DRM rights of the product file 330 before the 3D printer 340 prints the product. Furthermore, DRM within the JT file could be written such that only the "approved" printers can create that part or assembly.

According to disclosed embodiments, a 3D printer 340 as disclosed herein can implement printer-specific modifications to the product file 330 since the models are rebuilt at the printer by the CAD kernel 342 and processor 344. In this way, certain user or customer-specific customizations can be stored on the 3D printer 340 without putting these on the product files themselves or making them available for distribution or pirating.

According to disclosed embodiments, a 3D printer 340 as disclosed herein can run better analysis since they have the solid models. According to disclosed embodiments, a 3D printer 340 as disclosed herein can make simple geometric modifications (e.g., change thickness of a rib or diameter of a whole) right on the printer rather than going back to the original CAD system.

According to disclosed embodiments, a 3D printer 340 as disclosed herein can use an ISO-standard neutral file format, such as the JT file format, to decouple 3D printing from the original 3D CAD authoring package, thus leading to a more open marketplace because design file is decoupled from specific CAD software.

According to disclosed embodiments, a 3D printer 340 as disclosed herein can use the richness of the data in JT files (e.g., PMI, layer filters) to provide additional specific functionality unique to each printer.

Here is an example of how disclosed embodiments, for example a Parasolid-enabled 3D printer, provide significant advantages by decoupling manufacturing from design for consumers. Focusing, for example, on thermoplastics used by popular consumer 3D printers, each material has a minimum thickness. This means that at any one point within an object, it must be that thick for the object to support itself. Researchers are currently creating a "library" that states what the minimum thickness should be for various features of a plastic part according to the material or materials, since multi-material is now a common requirement in 3D printing.

The CAD kernel can then "regenerate" the original CAD model to abide by the "standards" defined in the library, that may be stored in storage 206, by applying minimum thicknesses and other properties identified by the 3D printer. This is possible in disclosed embodiments because the part designed for the original material was presumably validated through simulation to avoid distortion or warping. It is then possible to identify what thickness changes are required when the material is changed from a first material to a second material.

Even more powerful, however, is the possibility to future-proof any design. As better materials become available, the designer does not have to revise the design to take advantage of the improved strength or adaptive functionality; a 3D printer as disclosed herein can do the updating of the design automatically when the user chooses to print using the new materials. This would also allow users to build multiple quality products, based on the application needs, from different materials using the same design.

Disclosed embodiments include embedding a geometric-modelling/CAD kernel such as Parasolid within 3D printers, which can decouple design from manufacturing. Disclosed embodiments include using the JT file format as the interface between CAD software and 3D printers, which can therefore overcome several structural and materials-related weaknesses in 3D printers. The CAD file can include PMI information such as geometric dimensioning and tolerancing, which can be used to improve precision and structural analysis, and the layer filters can be used for distinguishing properties based on the material used. This kind of "model richness" is not available in other common formats like STL.

Disclosed embodiments include embedding CAD software in 3D printers and using b-rep, PMI, and layer information in the interface file format.

Figure 4:
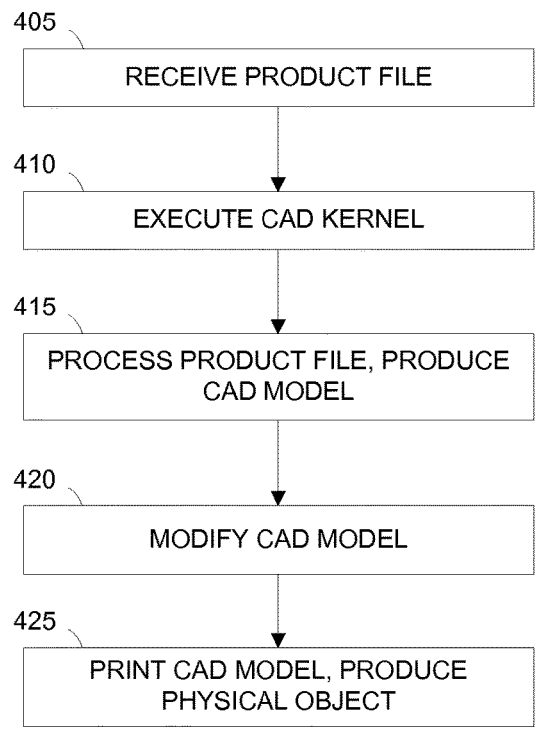
FIG. 4 illustrates a flowchart of a process in accordance with disclosed embodiments.

FIG. 4 illustrates a flowchart of a process in accordance with disclosed embodiments that can be performed by a 3D printer system as disclosed herein (referred to below as the "3D printer"). The 3D printer includes a CAD kernel, a processor, and printer components. The 3D printer can be particularly configured to perform the processes described herein. The 3D printer system, in disclosed embodiments, is a stand-alone 3D printer, not including a general-purpose data processing system.

The 3D printer receives a product file (405). The product file can be, in some cases, a CAD file in the JT file format. The product file 212 defines a CAD solid model such as CAD solid model 210, and can include one or more of a product structure, including layer information, visualizations and levels of details, b-rep geometry, PMI, data organization, and engineering-rich metadata. The 3D printer can store the product file, such as in storage 206. The 3D printer can verify that the product file can be loaded, manipulated, or printed according to digital rights management information. The product file can be received, for example, from a data processing system, by loading from storage, by receiving from another device or process, or otherwise.

The 3D printer executes a CAD kernel, such as CAD kernel 208 or CAD kernel 342 (410). The CAD kernel can execute on a processor such as processor 204 or processor 344. The CAD kernel can be, in some cases, a Parasolid kernel.

The CAD printer, using the CAD kernel, produces a CAD solid model from the product file (415). This can be performed by processing the definition for the solid model using the CAD kernel.

The CAD printer can modify the CAD solid model (420). This can be a modification in response to a user input received via a user interface. This can be a modification made according to minimum thicknesses and other properties identified by the 3D printer. The 3D printer can modify the CAD solid model according to the material used to produce the solid physical object 350, such as by adjusting thicknesses, tolerancing, internal structures including honeycomb structures and others, and other modifications to ensure that the CAD solid model conforms to the physical properties and requirements of the material used for the print process. The CAD solid model can store the modifications in the product file, in some cases.

The CAD printer produces a solid, functionally-viable physical object 350 corresponding to the CAD solid model, including any modifications made above (425).

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A 3D printer comprising:
a processor;
an accessible memory, the accessible memory storing:
a CAD kernel; and
a product file that defines a CAD solid model; and
3D printer components; and
wherein the 3D printer is configured to:
execute the CAD kernel using the processor such that the CAD kernel is embedded within the 3D printer itself;
process the product file using the CAD kernel such that the 3D printer itself produces the CAD solid model;
modify the CAD solid model using the CAD kernel embedded within the 3D printer itself to produce a modified CAD solid model that includes a change to the CAD solid model, including by:
identifying a second material to produce the solid physical object that is different from a first material specified in the product file;
determining a material thickness to apply to the CAD solid model for the second material from a standards library stored on the 3D printer itself; and
modifying the CAD solid model to change the material thickness applicable to the second material; and
produce a solid physical object corresponding to the modified CAD solid model using the 3D printer components.

2. The 3D printer of claim 1, wherein the 3D printer itself receives the product file from a data processing system.

3. The 3D printer of claim 1, wherein the 3D printer itself also verifies that the product file can be loaded, manipulated, or printed according to digital rights management information.

4. The 3D printer of claim 1, wherein the product file includes a product structure including layer information, visualizations, and levels of details.

5. The 3D printer of claim 1, wherein the product file includes boundary-representation geometry.

6. The 3D printer of claim 1, wherein the product file includes product manufacturing information.

7. The 3D printer of claim 1, wherein the 3D printer is further configured to, prior to producing the physical object corresponding to the modified CAD solid model:
modify the CAD solid model by applying a 3D model customization stored on the 3D printer itself.

8. A method performed by a 3D printer, the 3D printer having a processor and an accessible memory, the method comprising:
executing a CAD kernel using the processor such that the CAD kernel is embedded within the 3D printer itself;
receiving a product file that defines a CAD solid model, the CAD solid model created through a CAD application of a data processing system;
processing the product file and modifying the CAD solid model using the CAD kernel embedded within the 3D printer itself to produce a modified CAD solid model that includes a change to the CAD solid model made by the 3D printer itself, including by:
identifying a second material to produce the solid physical object that is different from a first material specified in the product file;
determining a material thickness to apply to the CAD solid model for the second material from a standards library stored on the 3D printer itself; and
modifying the CAD solid model to change the material thickness applicable to the second material; and
producing a solid physical object corresponding to the modified CAD solid model that is modified by the 3D printer itself.

9. The method of claim 8, further comprising, by the 3D printer:
verifying that the product file can be loaded, manipulated, or printed according to digital rights management information.

10. The method of claim 8, wherein the product file includes a product structure including layer information, visualizations, and levels of details.

11. The method of claim 8, wherein the product file includes boundary-representation geometry.

12. The method of claim 8, wherein the product file includes product manufacturing information.

13. The method of claim 8, wherein modifying the CAD solid model by the 3D printer itself comprises changing a specification of the CAD solid model according to a material used to produce the solid physical object.

14. The method of claim 8, wherein processing the product file and modifying the CAD solid model comprises applying user or customer-specific customizations, stored on the 3D printer itself, to produce the modified CAD model.

* * * * *